United States Patent [19]

Lipets et al.

[11] Patent Number: 4,576,226
[45] Date of Patent: Mar. 18, 1986

[54] MULTIPASS CORROSION-PROOF AIR PREHEATER

[76] Inventors: Adolf U. Lipets, prospekt Lenina, 150 a, Kv. 38; Svetlana M. Kuznetsova, Revprospekt, 16, kv. 21; Vadim B. Galuskin, Juzhny proezd, 9, kv. 58; Jury I. Lafa, ulitsa Mashinostroitelei, 28b, kv. 58; Ivan A. Sotnikov, ulitsa Mashinostroitelei, 32, kv. 114; Vladimir G. Ovchar, ulitsa Parkovaya, 49, kv. 43, all of Podolsk Moskovskoi oblasti; Alexei Z. Fedosov, ulitsa Burakova, 7, korpus 2, kv. 18, Moscow, all of U.S.S.R.

[21] Appl. No.: 486,073

[22] Filed: Apr. 18, 1983

[51] Int. Cl.[4] .......................... F28F 19/00; F28F 9/22
[52] U.S. Cl. .................................... 165/134.1; 165/921
[58] Field of Search ............ 165/134 R, 134 DP, 142, 165/139, 140, 144, 145, DIG. 2, DIG. 28

[56] References Cited

U.S. PATENT DOCUMENTS

| | | | |
|---|---|---|---|
| 2,970,811 | 2/1961 | Ruch et al. | 165/134 DP |
| 3,194,214 | 7/1965 | Frendberg | 165/134 DP |
| 4,243,096 | 1/1981 | Lipets et al. | 165/134 DP |
| 4,305,455 | 12/1981 | Lipets et al. | 165/145 |
| 4,483,391 | 11/1984 | Gilbert | 165/134 DP |

FOREIGN PATENT DOCUMENTS 909445 2/1982 U.S.S.R. ....................... 165/134 DP

Primary Examiner—William R. Cline
Assistant Examiner—John K. Ford
Attorney, Agent, or Firm—Steinberg & Raskin

[57] ABSTRACT

The herein disclosed multipass corrosion-proof preheater comprises a plurality of passes. The passes are formed by bundles of heat-transfer tubes for the passage of heating gases and interconnected in series, with respect to air supply, by means of connecting air lines. Air is supplied to the tubefield of the heat-transfer tubes via air supply line accommodating a device designed for high-temperature preheat of part of the air supplied to the tubefield of the heat-transfer tubes of the first pass. The air preheater further comprises a bypass air line serving to communicate the air line with the connecting air line via mixer mounted in the latter. In addition, the air preheater is provided with a device for low-temperature preheat of air, mounted in the air line upstream of the device when viewed in the direction of air flow. The bypass air line is connected to the air line between the devices for low- and high temperature air preheat.

11 Claims, 2 Drawing Figures

MULTIPASS CORROSION-PROOF AIR PREHEATER

BACKGROUND OF THE INVENTION

The present invention relates to heat-transfer technology and boiler-making and, more particularly, it relates to a multipass corrosion-proof air preheater.

The present invention can be used most advantageously in steam boilers, furnaces and like apparatuses which burn sulfur-bearing fuel and in whose air preheaters aggressive exit gases serve to heat up cool air.

In an air preheater, which is usually made multipass with respect to air supply, the first pass to which cool air is supplied is subject to intensive corrosion caused by the condensation of sulfuric acid vapors on relatively cool tube walls whose temperature depends on that of the exit gases and, even more, on the temperature of air flowing around the tubes. Inasmuch as the tubes of the first pass of the air preheater serve for the passage of the coolest gas and their outer surface is flown around with the coolest air, it is in the first pass that the tube wall temperature is rather low and, in part of the tubes, it is below the dew point of water vapors in flue gases containing sulfuric acid vapors. As a result, sulfuric acid condenses in various concentrations on the tube walls to cause intensive corrosion of metal and equally intensive crudding of tubes with ash deposits.

Due to corrosion of air preheater tubes, leading to local destruction of the latter, air from the tubefield gets into gases. Then, the capacity of the blow fan and smoke exhauster needs to be increased in order to obtain at the air preheater outlet the amount of air required for the boiler or furnace. This results in excessive consumption of energy. The energy consumption increases still further due to increased drag of the gas flow in tubes upon their clogging and crudding.

Later on, with the air preheater tubes being affected by corrosion, the blow fan and smoke exhauster capabilities are exhausted, as a result of which the boiler or furnace output needs to be decreased and, finally, the boiler or furnace is to be shut down for replacement of the damaged portion of the air preheater.

Well known in the art of boiler-making is a corrosion-resistant air preheater (cf., L. B. Krol, N. I. Rozengauz, Konvektivnyie elementy moschnykh kotelnykh agregatov - Convection Elements of Powerful Boiler Units, Energiya Publishers, Moscow, 1976, FIGS. 4-3, 4—4 pp. 132-133). Said prior art tubular air preheater is provided with a device for air preheat fashioned as a hot-air heater. Preheated air is supplied to the tubefield of the first pass. In such an air preheater, the tubes of the first pass, inside which relatively cool exit gases pass, are blown around on the outside with preheated air, as a result of which the wall tube temperature is higher than in the case of a conventional air preheater. Since the wall temperature is above the dew point of water vapors in exit gases, there is no condensation of moisture and, consequently, no corrosion and crudding of tubes are observed.

This air preheater is disadvantageous in that it effects adversely the efficiency of the boiler in which it is installed, due to increased temperature of exit gases leaving the air preheater caused by air preheat. Therefore, boiler makers only use such air preheater in cases when low air preheat is sufficient, i.e., when burning low-sulfur fuels featuring a low dew point of water vapors in exit gases. In burning high-sulfur fuels, high-temperature air preheat is required, however, this is accompanied by an inadmissibly high temperature of exit gases, and no increase of the heating surface is capable of appreciably cooling down the exit gases. In such cases, the above-considered air preheater appears inapplicable.

Also known in the art is a multipass corrosion-proof air preheater according to U.S. Pat. No. 4,243,096.

Said latter prior art air preheater has a plurality of passes series-connected, with respect to air supply, by means of connecting air lines. Each pass is formed by bundles of heat-transfer tubes designed for the passage of heating gases. The air preheater is provided with an air supply line connected with the pass that comes first in the direction of air flow. Mounted in the air supply line is a device for high-temperature preheat of pat of the air supplied to the tubefield of the bundles of heat-transfer tubes in the first pass. Upstream of the device for high-temperature air preheat, as viewed in the direction of air flow, at least one bypass air line is connected to the air supply line, said bypass air line serving to communicate the air supply line with the connecting air line via mixer installed in the latter.

In the latter prior art air preheater, only part of the air supplied to the first pass is subjected to high-temperature preheat in a special device such as air heater, while the remaining cool air enters the connecting air lines and a mixture of preheated and cool air at a temperature ensuring the wall tube temperature above the dew point of water vapors in exit gases is supplied to the subsequent passes of the air preheater. As a result, to each pass of the air preheater there is supplied highly preheated air ensuring the tube temperature above the dew point of water vapors in exit gases, so that no tube crudding and corrosion take place.

However, in spite of high-temperature preheat of air supplied to the first pass, the balance temperature of air supplied to the air preheater from the hot-air heater and bypass air line may be quite low and the mean temperature head of the air preheater stays high. Consequently, the exit gases can be cooled down appreciably, and the prior art air preheater requires no large increase of the heating surface for reducing the temperature of exit gases.

The latter prior art air preheater is deficient in that several bypass air lines need to be provided for increasing the mean temperature head by reducing the portion of highly preheated air supplied to the first pass, each one of said bypass air lines communicating the air supply line with each subsequent connecting air line via mixers mounted in the latter. This involves a complication of the general arrangement and structure of the air preheater, as well as lower reliability of its operation in view of the increased number of mixers in the connecting air lines. Moreover, such a structural arrangement of several bypass air lines results in a considerable portion of the air preheater heating surface being blown around with only part of the air, which affects the heat-transfer coefficient and mean temperature head of this surface of the air preheater. As a result, the overall efficiency of the air preheater is reduced.

SUMMARY OF THE INVENTION

An object of the present invention is to increase the efficiency of the air preheater due to increase of temperature of air supplied into the connecting air line accommodating a mixer.

Another object of the present invention is to simplify the construction and to improve reliability of the air preheater due to decrease number of the mixers and number of the bypass air lines.

In accordance with the above-mentioned and the other objects the essence of the present invention consists in that in the air preheater according to the present invention provision is made for a device for low-temperature air preheat mounted in an air supply line upstream of a device for high-temperature air preheat, as viewed in the direction of air flow, a bypass air line being connected to the air supply line between the devices for low- and high-temperature air preheat.

Such an arrangement of the air preheater of the invention helps increase the flow rate of air supplied to a connecting air line via bypass air line, this resulting in the reduction of the flow rate of air supplied to the first pass. This characteristic feature of the preheater is connected with the fact that the mixing in the mixer of the air heated in the first pass with increased amount of the air being bypassed provides for the desired temperature of the air mixture at the inlet to the second pass owing to the increased temperature of the air being bypassed that was heated in the device for low-temperature preheat. As a result, it is quite frequently that an air preheater under conditions of low flow rate of highly heated air may be provided with a single bypass air line.

The herein disclosed air preheater is extremely simple of design and general arrangement and highly reliable thanks to the presence of but a single mixer. At the same time, it features an increased efficiency inasmuch as the highly heated air is supplied to the air preheater in small amounts and, consequently, the balance temperature of air supplied to the air preheater is rather low and the air preheater has a relatively high mean temperature head. In addition, a large portion of its heating surface is flown around by the entire air with only a small part of the heating surface contained in the first pass being flown around by part of the air, hence its high coefficient of heat transfer.

BRIEF DESCRIPTION OF THE DRAWINGS

The present invention will be better understood upon considering the following detailed description of an exemplary embodiment thereof, with due reference to the accompanying drawings in which.

DETAILED DESCRIPTION OF PREFERRED EMBODIMENTS

Figure 1:
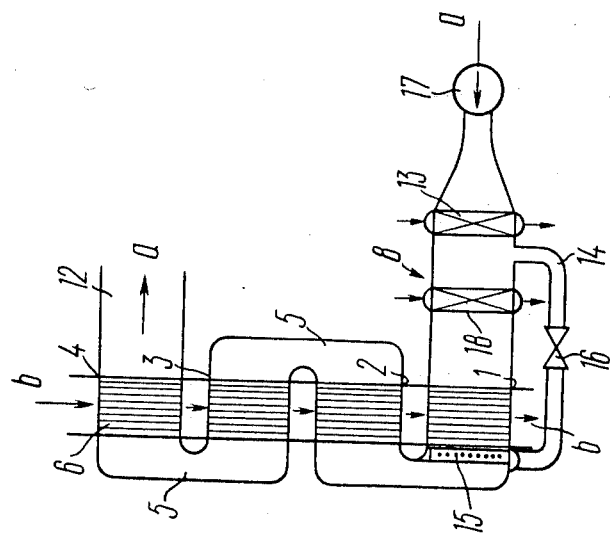
FIG. 1 shows diagrammatically a four-pass corrosion-proof air preheater, according to the present invention, with a device for high-temperature air preheat fashioned as a direct-contact heat exchanger.

Referring now to FIG. 1 of the accompanying drawings, the air preheater according to the invention comprises four passes 1, 2, 3 and 4 interconnected in series, with respect to the air supply, by means of connecting air lines 5. Each one of the passes 1 to 4 is formed by bundles of heat-transfer tubes 6 designed for the passage of heating gases, b. Connected to the first pass 1 is an air supply line 7 accommodating a device 8 for high-temperature preheat of portion of air fashioned as a direct-contact heat exchanger 9 (cf. Aerodinamicheskii raschot kotel'nykh ustanovok (normativnyi metod)—Aerodynamic Calculation of Boiler Units (standardized method), ed. by S. I. Mochan, Energiya Publishers, Leningrad, 1977, FIG. III-3, p. 66).

Heating air, a, is supplied to the heat exchanger 9 by means of a fan 10 via recirculating air line 11 from a hot-air line 12 connected to the fourth pass 4 of the air preheater. In the herein disclosed air preheater, provision is made for a device 13 for low-temperature air preheat fashioned as a hot-air heater (cf., L. B. Krol, N. I. Rozengauz, Konvektivnyie elementy moschnykh kotelnykh agregatov—Convection Elements of Powerful Boiler Units, Energiya Publishers, Moscow, 1976, FIGS. 4-3, 4-4 pp. 132-133) mounted in the air supply line 7 upstream of the heat exchanger 9, as viewed in the direction of air flow. A bypass air line 14 communicates the air supply line 7 with the connecting air line 5 accommodating a mixer 15. Mounted in the bypass air line 14 is a control valve 16. One end of the bypass air line 14 is connected to the air supply line 7 between the heat exchanger 9 and device 13 for low-temperature air preheat, the other end of said bypass air line being connected to the mixer 15. The supply of air to the air supply line 7 is effected by means of a blower fan 17.

The air preheater according to the present invention operates in the following manner.

Supplied to the passes 1 to 4, in reverse order from the fourth to first, are heating gases which pass in the heat-transfer tubes 6 to get cooled down therein and to heat up the air passing in the tubefield. The air is supplied to the air preheater by means of the blower fan 17 via air supply line 7. All of the cool air is first supplied to the device 13 where it is subjected to low-temperature preheat from 30° C. up to, say, 50°–70° C. Thereupon, part of the air preheated to 50°–70° C. enters the direct-contact heat exchanger 9 while the remaining air is directed via bypass air line 14 to the mixer 15. The air heated to a high temperature of, say, 100°–150° C. in the heat exchanger 9 is supplied to the tubefield of the bundles of heat-transfer tubes 6 of the first pass 1 of the air preheater where it is heated up by the heating gases which, in turn, are cooled down to 130°–180° C. Thanks to the high temperature of the air supplied to the tubefield, the temperature of the metal of tubes 6 is above the dew point of water vapors in flue gases and, therefore, no ash deposition and corrosion occur on the heat transfer tubes 6. The air heated in the first pass 1 is supplied to the connecting air line 5 to be thoroughly mixed, by means of the mixer 15 mounted therein, with the remaining air heated up to 50°–70° C. and supplied to the mixer 15 from the bypass air line 14. By means of the control valve 16, the ratio between the flow rates of air supplied to the first pass 1 and to the bypass air line 14 is set so that the temperature of air mixture in the connecting air line 5 be such that the heat-transfer tubes 6 of the second pass 2 would not corrode. Then, all of the air, while being heated, passes through the third and fourth passes 3, 4 in succession to leave the air preheater via the hot-air line 12. The presence of only one bypass air line 14 and one mixer 15 render the air preheater structure and general arrangement simpler and provide for its reliable corrosion-free operation.

The high-temperature preheat of but minor portion of the air supplied to the air preheater ensures a low balance inlet temperature thereof and, accordingly, a high temperature head in the preheater, while the fact that the greater part of the air preheater heating surface is flow around by all of the air provides for a high coefficient of heat transfer in the air preheater. Both said features make for a high efficiency of the air preheater.

In the herein described embodiment, the combination of high-temperature air preheat in the hot-air heater 13 and low temperature air preheat in the direct-contact heat exchanger 9 serves to enhance the efficiency of the air preheater inasmuch as both stages of air preheat are effected using the most efficient techniques, for example, low-temperature preheat is effected using the heat obtained by the extraction of low-pressure steam in the turbines and high-temperature preheat-by means of moderate and readily controlled recirculation of hot air.

Figure 2:
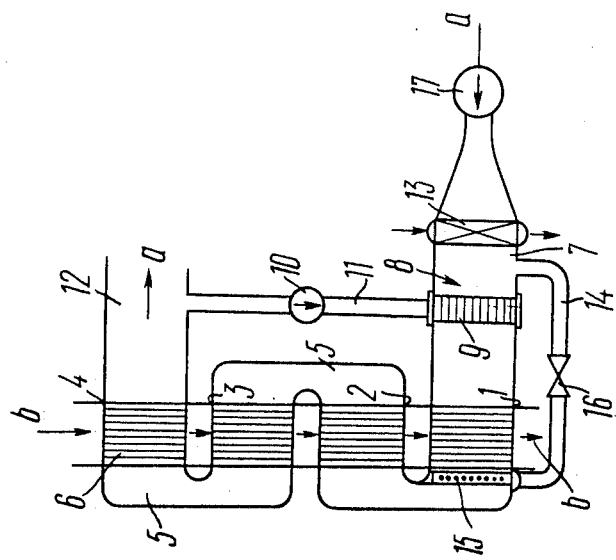
FIG. 2 shows diagrammatically a four-pass corrosion-proof air preheater, according to the present invention, with a device for high-temperature air preheat fashioned as a surface heat exchanger.

Under conditions of air preheater operation as part of a steam-turbine facility and at a moderate temperature of air supplied to the tubefield of the first pass, say, about 100°–120° C., it is expedient that the device 8 for high-temperature air preheat be fashioned as a surface heat exchanger 18 (FIG. 2) heated by low-pressure steam extracted from a turbine (not shown). The air preheater operates in a manner analogous with that described above.

The multipass corrosion-proof air preheater according to the present invention is capable of continuous reliable, corrosion- and crudding-free operation under conditions of high-sulfur gas flow in heat-transfer tubes. By the present time, such air preheater has been in operation for a period of four years. In addition, the herein disclosed air preheater is capable of cooling down the gases leaving the boiler or furnace to a temperature which is only 30°–40° C. above that of the air supplied to the first pass. Even at the temperature of air heated up to 150° C. and supplied to the first pass, the temperature of exit gases is maintained at the level of 180° C. The air preheater according to the invention helps increase the efficiency of a steam turbine unit thanks to the use in the high-temperature air preheat device the heat of low-pressure steam extracted from the turbine.

Thus, for instance, the use of the air preheater according to the present invention in a 300-MW steam-turbine unit fired with high-sulfur coal according to the present invention led to a 0.6% increase of the unit efficiency.

What is claimed is:

1. A multipass, corrosion-proof, air heater, comprising:
    heat transfer tubes adapted to carry heating gases therein;
    a plurality of ducts adapted to carry air to be heated, each duct being disposed about said heat transfer tubes;
    a plurality of passes for air to be heated, each such pass formed by a respective duct;
    at least one connecting line, communicating with and interconnecting said plurality of passes in series;
    a line for supplying air into a first one of said passes and communicating with said first pass;
    a first heat exchanger for initially substantially pre-heating the air flowing through said supply line;
    a second heat exchanger for further heating the air flowing through said supply line to a higher level, said second heat exchanger situated in said supply line downstream of said first heat exchanger in the direction of air flow through said supply line;
    a bypass line communicating with said supply line at a point between said first and second heat exchangers, and communicating with said at least one connecting line; and
    means for mixing air flowing through said bypass line with air flowing into said at least one connecting line from at least one of said plurality of passes, said mixing means being disposed in said at least one connecting line.

2. The heater of claim 1, comprising:
    four passes; and
    three connecting lines, each line communicating with and interconnecting a respective two of said four passes;
    said bypass line communicating with a first one of said three connecting lines which interconnects said first one and a second one of said four passes in the direction of airflow therethrough;
    with said mixing means disposed within said first connecting line to mix air flowing through said bypass line with air flowing into said first connecting line from said first one of said four passes.

3. The heater of claim 1, additionally comprising:
    valve means disposed within said bypass line for controlling flow rates of air flowing through said bypass line and air flowing through said second heat exchanger.

4. The heater of claim 2, wherein
    said first heat exchanger for initially pre-heating the air is a hot-air heater, and
    said second heat exchanger for further heating the air is a surface heat exchanger, heated by low pressure steam.

5. The heater of claim 1, wherein said first heat exchanger constitutes means for heating the air from about 30° C. up to about 50° C.–70° C.

6. The heater of claim 5, wherein said second heat exchanger constitutes means for heating the air to about 100° to 150° C.

7. The heater of claim 1, wherein
    said first heat exchanger for initially preheating the air is a hot-air heater, and
    said second heat exchanger for further heating the air is a direct-contact heat exchanger, comprising means for recirculating air thereto from air exiting from a final one of said plurality of passes and for mixing the same with the air to be preheated.

8. The heater of claim 7, additionally comprising an outlet line communicating with said final one of said passes and through which the air exiting from said final one of said passes flows, and wherein
    said means for recirculating and mixing comprise a recirculating air line connected with said direct-contact heat exchanger and with said outlet line, and
    a fan disposed within said recirculating line.

9. The heater of claim 8, wherein said second heat exchanger constitutes means for cooling the recirculated air to a temperature about 30° C.–40° C. greater than temperature of the air supplied into said first pass.

10. The heater of claim 1, wherein said first heat exchanger is a low pressure steam heater constituting means for effecting heating of the air flowing through said supply line with low pressure steam generated in a turbine.

11. The apparatus of claim 1, additionally comprising a blower fan situated in said supply line upstream of said first heat exchanger.

* * * * *